Nov. 1, 1966   A. VENEMA ETAL   3,282,058
DEVICE FOR PRODUCING VERY LOW GAS PRESSURES
Filed July 6, 1965
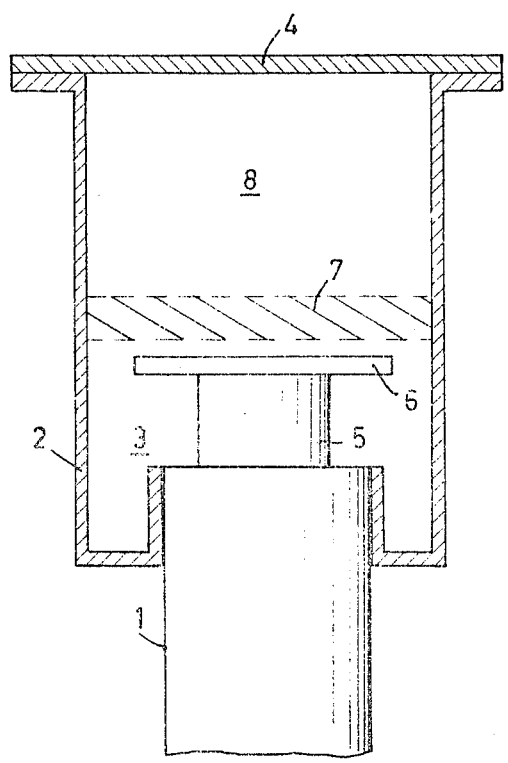
INVENTORS
ALBERTUS VENEMA
GIJSBERT PRAST
BY
AGENT 3,282,058
DEVICE FOR PRODUCING VERY LOW GAS PRESSURES
Albertus Venema and Gijsbert Prast, both of Emmasingel, Eindhoven, Netherlands, assignors to North American Philips Company, Inc., New York, N.Y., a corporation of Delaware
Filed July 6, 1965, Ser. No. 469,387
Claims priority, application Netherlands, July 17, 1964, 6408166
3 Claims. (Cl. 62—6)

The invention relates to a device for producing very low pressures, comprising a space to be exhausted with one or more walls of thermally good conducting material, said walls being in thermal contact with the wall of the expansion space of a cold-gas refrigerator.

If in such a device a given process is performed, it may occur that the gas pressure does not remain sufficiently low. Various gases, which may be used in such a process, for example nitrogen, carbon monoxide, methane and the like, still have a saturated vapor pressure at a temperature of 80° K., i.e. a possible temperature of the wall of an expansion space of a cold-gas refrigerator, which pressure is much too high. It is then desirable to apply a lower temperature.

In the device according to the invention the cold-gas refrigerator comprises more than one expansion space and the wall concerned of the space to be exhausted is in thermal contact with the wall of one expansion space of a higher average temperature than that of a further expansion space, one wall of which is in thermal contact with a wall arranged in the space to be exhausted.

In the device according to the invention the low temperatures of the stages of the refrigerator are fully utilized.

The wall of the vacuum system is, for example, in good thermal contact with the first stage of such a cold-gas refrigerator at about 80° K., while a separate portion of adequate surface, for example, a flat plate forming the bottom of the vacuum working space, or a separate sleeve inside said space is in good thermal contact with the second stage, hence at a lower temperature of for example 15 to 20° K.

This novel device has an advantage over that in which the whole vacuum system and hence also the wall are at the same low temperature, in that the radiation towards the portion of the lowest temperature is, as a matter of course, very slight.

A temperature of the walls of the vacuum system of about 80° K. is found to be sufficient to penetrate rapidly into the ultra-high vacuum range.

In order to utilize the cold produced to the optimum it is desirable to screen the portion at the lowest temperature against radiation that may be produced inside the vacuum system, for example by the process involved.

In one embodiment of the invention one or more gas-permeable radiation screens in good thermal contact with the walls of the space to be exhausted is (are) arranged between the working space in the vacuum system and the wall which is in thermal contact with the wall of the expansion space of the lower average temperature.

Said radiation screens have to be constructed so that the part of the lowest temperature does, so to say, not "see" the hotter portions, while an adequate passage of gas molecules is guaranteed.

Such radiation screens are known per se.

The drawing shows diagrammatically one embodiment in a longitudinal sectional view and partly in an elevation.

Reference numeral 1 designates the wall of an intermediate stage of a cold-gas refrigerator, which wall may assume a temperature of for example 80° K.

With the wall 1, the wall 2 of a vacuum space 3 is in good thermal contact, for example by a soldering joint. The wall 2 is closed at the top in a vacuum-tight manner by a lid 4.

At 5 the wall of a stage (expansion space) of a cold-gas refrigerator is shown, where in this case the lowest temperature of for example 15 to 20° K. prevails.

With the wall 5 a plate 6 is in intimate thermal contact, for example by soldering. Above the plate 6 there is arranged a radiation screen 7, which is in good thermal contact with the wall 2.

The space 8 is the working space in which an extremely high vacuum can be obtained.

What is claimed is:

1. A device for producing very low pressures comprising a cold gas refrigerator provided with a plurality of expansion spaces, an enclosure to be exhausted having at least one wall constituted of a material of good thermal conductivity, said enclosure having a working space, said wall being in thermal contact with said expansion space having a higher average temperature than another expansion space, one of the walls of said other expansion space being in thermal contact with the wall arranged in the enclosure to be exhausted.

2. A device for producing very low pressures as claimed in claim 1 wherein said one of the walls of said other expansion space is a plate which forms a bottom surface of the working space of said enclosure to be exhausted.

3. A device for producing very low pressures as claimed in claim 1 further comprising at least one radiation screen located between the working space of said enclosure to be exhausted and the wall which is in thermal contact with the wall of said other expansion space, said radiation screen being in good thermal contact with the wall of said enclosure to be exhausted.

References Cited by the Examiner
UNITED STATES PATENTS
2,966,034  12/1960  Gifford _____ 62—6
FOREIGN PATENTS
981,744  1/1951  France.

WILLIAM J. WYE, *Primary Examiner.*